United States Patent
Watfa et al.

(10) Patent No.: US 12,401,988 B2
(45) Date of Patent: Aug. 26, 2025

(54) IN AND RELATING TO MULTI-USIM IN MOBILE TELECOMMUNICATION ENVIRONMENT

(71) Applicant: Samsung Electronics Co., Ltd., Gyeonggi-do (KR)

(72) Inventors: Mahmoud Watfa, Middlesex (GB); Lalith Kumar, Bangalore (IN)

(73) Assignee: Samsung Electronics Co., Ltd (KR)

( * ) Notice: Subject to any disclaimer, the term of this patent is extended or adjusted under 35 U.S.C. 154(b) by 335 days.

(21) Appl. No.: 17/949,785

(22) Filed: Sep. 21, 2022

(65) Prior Publication Data
US 2023/0087650 A1    Mar. 23, 2023

(30) Foreign Application Priority Data

| | | |
|---|---|---|
| Sep. 22, 2021 | (IN) | 202131042904 |
| Sep. 29, 2021 | (IN) | 202131044160 |
| Sep. 20, 2022 | (GB) | 2213735 |

(51) Int. Cl.

| | |
|---|---|
| *H04W 8/22* | (2009.01) |
| *H04W 48/14* | (2009.01) |
| *H04W 48/16* | (2009.01) |
| H04W 60/00 | (2009.01) |
| H04W 88/06 | (2009.01) |

(52) U.S. Cl.
CPC ............ *H04W 8/22* (2013.01); *H04W 48/14* (2013.01); *H04W 48/16* (2013.01); *H04W 60/005* (2013.01); *H04W 88/06* (2013.01)

(58) Field of Classification Search
CPC ....... H04W 8/22; H04W 48/14; H04W 48/16; H04W 60/005; H04W 88/06; H04W 48/18; H04W 68/005; H04W 76/27; H04W 76/30; H04W 8/183; H04W 60/00; H04W 68/00; H04W 48/02; H04W 68/02
See application file for complete search history.

(56) References Cited

U.S. PATENT DOCUMENTS

| | | | |
|---|---|---|---|
| 2022/0240222 A1* | 7/2022 | Youn | H04W 60/005 |
| 2022/0272660 A1* | 8/2022 | Luetzenkirchen | H04W 68/02 |

(Continued)

FOREIGN PATENT DOCUMENTS

| | | |
|---|---|---|
| WO | WO 2020/250005 | 12/2020 |
| WO | WO 2021/015502 | 1/2021 |

(Continued)

OTHER PUBLICATIONS

3GPP TS 23.502 V 17.1.0, 3GPP, 3rd Generation Partnership Project; Technical Specification Group Services and System Aspects; Procedures for the 5G System (5GS); Stage 2 (Release 17), Jun. 2021, 679 pages.

(Continued)

*Primary Examiner* — Julio R Perez
(74) *Attorney, Agent, or Firm* — The Farrell Law Firm, P.C.

(57) ABSTRACT

A method and an apparatus with multi-universal subscriber identity module (MUSIM) capability in wireless communication system. A service request procedure is initiated in case that a user equipment (UE) does not have allowed network slice selection assistance information (NSSAI) and an associated trigger is related to a MUSIM feature.

16 Claims, 5 Drawing Sheets

(56) References Cited

U.S. PATENT DOCUMENTS

2022/0286993 A1* 9/2022 Youn .................. H04W 8/06
2023/0337122 A1* 10/2023 Tamura .................. H04W 60/04

FOREIGN PATENT DOCUMENTS

WO     WO 2021/066562     4/2021
WO     WO 2021/162487     8/2021

OTHER PUBLICATIONS

International Search Report dated Dec. 27, 2022 issued in counterpart application No. PCT/KR2022/014157, 6 pages.
Samsung, "Service request procedure due to MUSIM when no allowed NSSAI is available", 3GPP TSG-CT WG1 Meeting #132-e C1-216033 E-meeting, Oct. 11-15, 2021, pp. 38.
Samsung, InterDigital, Nokia, Nokia Shanghai Bell, "NAS connection release from 5GMM-CONNECTED mode with RRC inactive indication", 3GPP TSG-CT WG1 Meeting #132-e C1-216044, E-meeting, Oct. 11-15, 2021, pp. 6.
Samsung, "Clarification on suspend indication", 3GPP TSG-CT WG1 Meeting #134-e C1-221664 E-meeting, Feb. 17-25, 2022, pp. 3.
3GPP TS 24.301 V17.6.0 (Mar. 2022), 3rd Generation Partnership Project; Technical Specification Group Core Network and Terminals; Non-Access-Stratum (NAS) protocol for Evolved Packet System (EPS); Stage 3 (Release 17), pp. 591.
3GPP TS 24.501 V17.5.0 (Dec. 2021), 3rd Generation Partnership Project; Technical Specification Group Core Network and Terminals; Non-Access-Stratum (NAS) protocol for 5G System (5GS); Stage 3; (Release 17), pp. 916.
ZTE, Musim-Capable UE Release NAS Connetion after Transition from 5GMM-Connected Mode with RRC Inactive Indication to 5GMM-Connected Mode, C1-213002, 3GPP TSG-CT WG1 Meeting #130-e, May 20-28, 2021, 5 pages.
3GPP TS 24.501, V17.4.0, (Sep. 2021), pp. 1567.
European Search Report dated Nov. 29, 2024 issued in counterpart application No. 22873181.6-1215, 6 pages.

* cited by examiner

IN AND RELATING TO MULTI-USIM IN MOBILE TELECOMMUNICATION ENVIRONMENT

PRIORITY

This application claims priority under 35 U.S.C. § 119 (a) to Indian Provisional Patent Application Nos. 202131042904 (PS) and 202131044160 (PS) filed in Indian Patent Office on Sep. 22, 2021 and Sep. 29, 2021, respectively, and UK Patent Application No. 2213735.0 filed in the UK Intellectual Property Office on Sep. 20, 2022, the contents of which are incorporated herein by reference.

TECHNICAL FIELD

The present disclosure relates to generally to a universal mobile telecommunications service (UMTS) subscriber identity module (SIM) within a user equipment (UE) serving as an identifier of the UE, and more particularly to improvements in and relating to a multi-universal subscriber identity module (USIM) in a mobile telecommunication environment.

BACKGROUND

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave, including 28 GHz and 39 GHz. Additionally, it has been considered to implement sixth generation (6G) mobile communication technologies (referred to as beyond 5G systems) in terahertz bands (e.g., 95 GHz to 3 THz bands) in order to achieve transmission rates that are fifty times faster than 5G mobile communication technologies and ultra-low latencies that are one-tenth of 5G mobile communication technologies.

Upon developing 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for a large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio-unlicensed (NR-U) aimed at system operations conforming to various regulation-related requirements in unlicensed bands, new radio (NR) UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIOT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (i.e., 2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the increasing number of connected devices will be connected to communication networks, and it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional-MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to an aspect, a method of operating a UE with multi-universal subscriber identity module (MUSIM) capability in a wireless communication system is provided. A service request procedure is initiated in case that the UE does not have allowed network slice selection assistance information (NSSAI) and an associated trigger is related to a MUSIM feature.

According to another aspect, a UE with MUSIM capability in wireless communication system is provided. The UE includes a transceiver, and at least one processor coupled with the transceiver. In case that the UE does not have allowed NSSAI and an associated trigger is related to a MUSIM feature, a service request procedure is initiated.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
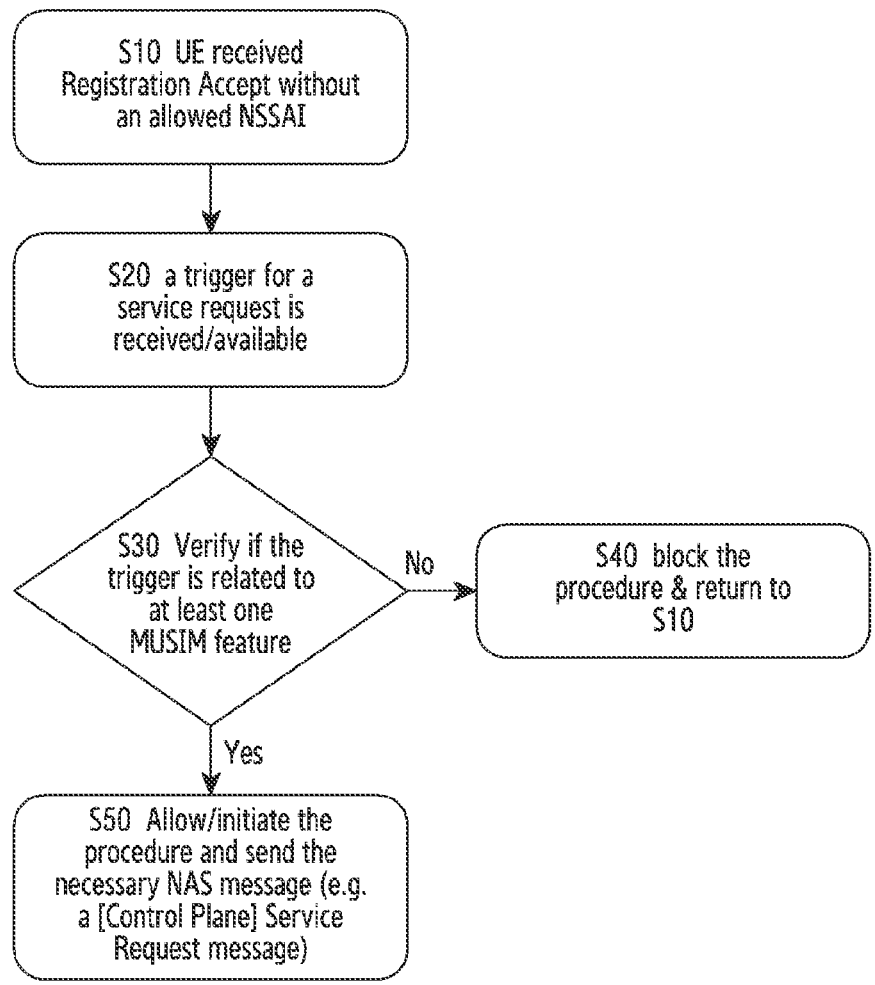
FIG. 1 is a flowchart illustrating UE behavior for an exception to the service request procedure due to a MUSIM feature, according to an embodiment.

Embodiments of the disclosure are described in detail with reference to the accompanying drawings. The same or similar components may be designated by the same or similar reference numerals although they are illustrated in different drawings. Detailed description of constructions or processes known in the art may be omitted to avoid obscuring the subject matter of the disclosure.

Definitions of certain words and phrases used herein are set forth below. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein are not intended to limit and/or define the scope of the present disclosure. For example, unless otherwise defined, the technical terms or scientific terms used in the present disclosure shall have the ordinary meaning understood by those with ordinary skills in the art to which the present disclosure belongs.

It should be understood that "first", "second" and similar words used herein do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", "one embodiment" or "embodiment" means that particular elements, features, structures or characteristics described in connection with the embodiment are included in at least one embodiment. The phrases "in one embodiment" or "in one example" appearing in different places in the specification do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

Embodiments of the disclosure are for illustration only and should not be interpreted as limiting the scope of the disclosure in any way. Those skilled in the art will understand that the principles of the disclosure can be implemented in any suitably arranged wireless communication system. For example, although the disclosure is directed to long term evolution (LTE) and 5G communication systems, those skilled in the art can understand that the main points of the disclosure can also be applied to other communication systems with similar technical backgrounds and channel formats with slight modifications without departing from the scope of the disclosure. For example, the communication systems may include a global system for mobile communications (GSM) system, code division multiple access (CDMA) system, wideband code division multiple access (WCDMA) system, general packet radio service (GPRS), LTE system, LTE frequency division duplex (FDD) system, LTE time division duplex (TDD), universal mobile telecommunications system (UMTS), worldwide interoperability for microwave access (WiMAX) communication system, 5G system or NR, etc. Additionally, technical schemes of the embodiments can be applied to future-oriented communication technologies.

A MUSIM UE supports more than one USIM, and hence can be simultaneously registered to multiple public land mobile networks (PLMNs) (or more conveniently, networks). When this is the case, the multiple registrations can lead to the UE switching between the PLMNs for the purpose of receiving a particular service (e.g., voice service). The UE can send some information to a serving network (e.g., the access and mobility management function (AMF) of the network), which helps determine the UE's preferences with respect to MUSIM operations. For example, the UE may send a 'paging restriction' to inform the network about whether the UE would prefer to be paged, or whether paging should be restricted for all or some services, etc.

The description of the MUSIM features is provided in 3GPP TR 23.501 V17.1.1.

Other details regarding the UE behavior with respect to the MUSIM feature can be found in 3GPP TS 24.501 V17.3.1.

An overview of network slice-specific authentication & authorization (NSSAA) is set forth below. NSSAA ensures that a registered UE will always have a slice that is either allowed because is it not subject to NSSAA or, if it is subject to NSSAA, then the authentication must first succeed before the allowed network slice selection assistance information (NSSAI) is provided to the UE.

When slices are subject to NSSAA, the UE can receive a Registration Accept message with no allowed NSSAI, as described in 3GPP TS 24.501 V17.3.1. In this case, the message will contain a pending NSSAI and the "NSSAA to be performed" indicator set to "Network slice-specific authentication and authorization is to be performed". The network then performs the NSSAA procedure and if there is at least one slice for which the NSSAA succeeds, then the slice is provided to the UE as the allowed NSSAI. Otherwise, if no slice is available due to failed NSSAA, then the UE will be deregistered.

While the UE is awaiting the result of NSSAA (i.e., while no allowed NSSAI is received by the UE), the UE is prohibited from initiating certain procedures (e.g., the service request procedure), except if specific conditions are met. This behavior is described in 3GPP TS 24.501 V17.3.1.

The cases defined as triggers for the service request procedure are provided in 3GPP TS 24.501 V17.3.1.

The exceptions to the initiation of the service request procedure when no allowed NSSAI is available include cases f) and i) which are:

"f) the UE in 5GMM-IDLE mode over non-3GPP access, with T3346 not active or upon expiry of T3346, receives or has already received an indication from the lower layers of non-3GPP access, that the access stratum connection is established between UE and network;

. . .

i) the UE, in 5GMM-CONNECTED mode over 3GPP access or in 5GMM-CONNECTED mode with RRC inactive indication, receives a fallback indication from the lower layers (see subclauses 5.3.1.2 and 5.3.1.4) and the UE has a pending NAS procedure other than a registration, service request, or de-registration procedure;"

All other cases (of triggers for the service request procedure) would therefore be prohibited when no allowed NSSAI is available at the UE.

One of the modes of a UE in the fifth generation system (5GS) is a fifth generation mobility management (5GMM)-CONNECTED mode with RRC inactive indication. In this mode, the non-access stratum (NAS) connection is considered to be established while the RRC is considered to apply the procedures of RRC_IDLE state. The detailed behavior of a UE in 5GMM-CONNECTED mode with RRC inactive indication is provided in section 5.3.1.4 of 3GPP TS 24.501 V17.3.1:

This section defines the current triggers for which the UE (or NAS) will request the lower layers to resume the connection. After the connection is resumed (i.e., the RRC enters the RRC_CONNECTED state), the NAS would enter 5GMM-CONNECTED mode with RRC inactive indication.

There are a number of problems associated with the aforementioned description. The first relates to impacts to the MUSIM feature due to a lack of an allowed NSSAI. As described above, a UE without an allowed NSSAI (e.g., due to an ongoing NSSAA procedure), would not be allowed to initiate a service request procedure unless the trigger is related to the current existing exceptions as defined in 3GPP TS 24.501 V17.3.1. However, since the use of a MUSIM feature is currently not part of these exceptions, the UE that requires its NAS connection to be released so that it can get service on another PLMN will face delays since it cannot send a (control plane) service request message to request the release of the NAS connection. This means that the UE that needs to leave its current PLMN to go to another PLMN and place a voice call will not be able to do so (i.e., the UE without an allowed NSSAI is not able to request the network to release the NAS connection as required), as described above. This will cause a negative user experience since the call will be delayed. As such, the problem is that the current exceptions do not address the MUSIM feature and need to be updated.

A second problem relates to undefined UE behavior for a MUSIM service when in 5GMM-CONNECTED mode with RRC inactive indication. For a UE in 5GMM-CONNECTED mode with RRC inactive indication, the UE may require use of a MUSIM service (e.g., to leave the current PLMN and use another PLMN and hence another USIM). This leads to different UE behaviors and the network would not be able to predict how different UEs will behave. In other words, the UE will not be able to leave to another PLMN and this will cause a delay in the service. This can also potentially lead to different UEs behaving in an unexpected manner, which leaves the network unable to control how the UEs would leave to get service in another PLMN. It is normally desirable for UEs to follow a standardized behavior as otherwise there will be negative outcomes when different UEs behave differently (e.g., by generating signalling or leaving a network without notification that can later lead to wasted transmissions of downlink signalling). Moreover, the UE behavior needs to be defined so as to reduce delays in obtaining MUSIM services.

A third problem relates to undefined UE behavior for a MUSIM service when in a 5GMM-IDLE mode with suspend indication. For a UE in 5GMM-IDLE mode with suspend indication, the UE may require use of a MUSIM service (e.g., to leave the current PLMN and use another PLMN and hence another USIM). This leads to different UE behaviors and the network would not be able to predict how different UEs will behave. It is normally desirable for UEs to follow a standardized behavior as otherwise there will be negative outcomes when different UEs behave differently (e.g., by generating signalling or leaving a network without notification that can later lead to wasted transmissions of downlink signalling). Moreover, the UE behavior needs to be defined so as to reduce delays in obtaining MUSIM services.

According to an embodiment, a method of operating a UE with MUSIM capability is provided. If the UE does not have an allowed NSSAI, a service request procedure is permitted if an associated trigger is related to a MUSIM feature.

If a REGISTRATION ACCEPT message:
 a) includes a 5GS registration result information element (IE) with the "NSSAA to be performed" indicator set to "Network slice-specific authentication and authorization is to be performed";
 b) includes pending NSSAI; and
 c) does not include allowed NSSAI,
then the UE may delete stored allowed NSSAI, if present, and may not initiate the service request procedure unless associated with a MUSIM feature.

According to another embodiment, a method of operating a UE with MUSIM capability is provided. If the UE is in 5GMM-CONNECTED mode with RRC inactive indication, and experiences a MUSIM request, the UE either sends a NAS message to request the MUSIM service from a connected network, or the UE autonomously enters 5GMM-IDLE mode.

The UE may request the network to release the NAS signalling connection. The request may include paging restrictions.

According to another embodiment, a method of operating a UE with MUSIM capability is provided. If the UE is in an evolved packet system (EPS) mobility management (EMM)-IDLE mode with suspend indication, and experiences a MUSIM request, the UE either sends a NAS message to request the MUSIM service from a connected network or the UE autonomously enters EMM-IDLE mode.
 If the NAS message is
 iii) a service request message;
 ii) a control plane service request message, and the UE did not include any EPS session management (ESM) message container, NAS message container, EPS bearer context status information element, or UE request type information element; or
 iii) an extended service request message, and the service type information element indicates "packet services via S1" and the UE did not include any EPS bearer context status information element, or UE request type information element, then the message may not be sent.

The MUSIM feature may be one of: connection release, paging cause indication, reject paging request, paging restriction, and delete stored paging restrictions information.

According to another embodiment, an apparatus arranged to perform the method of any preceding aspect is provided.

The term "MUSIM feature" can be related to, or can refer to, any of the following: connection release (e.g., for MUSIM), paging cause indication (e.g., for MUSIM), reject paging request (e.g., for MUSIM), or paging restriction (e.g., for MUSIM), or any combination of these features.

The details set out herein can be applied in any combination and in any order. They can also be applied to the UE in S1 mode (if possible) or N1 mode, or both (if possible). S1 mode may refer to EPS, and N1 mode may refer to 5GS, and as such the network may refer to one or more nodes such as the MME (in EPS) or the AMF (in 5GS).

Herein, a request that is related to a MUSIM feature, or a request to obtain a MUSIM service, may refer to the sending of a NAS message that optionally includes the UE request type IE, where optionally the information element (IE) may be set to indicate "NAS signalling connection release" or "rejection of paging" or any value that may be defined in the future for this IE.

The UE allows the initiation of a service request procedure for MUSIM even when no allowed NSSAI is available. When the UE receives a registration accept message that does not include an allowed NSSAI, optionally includes a pending NSSAI, and optionally includes the 5GS registration result IE with the "NSSAA to be performed" indicator set to "network slice-specific authentication and authorization is to be performed", then the UE may not permit the initiation of the (or may not initiate the) service request procedure except if the reason to do so is for a MUSIM feature, where for example the UE needs to indicate in/set the request type to "NAS signalling connection release" or to "rejection of paging" in the UE request type IE of the service request message or of the control plan service request message (or when any other new value that is related to a MUSIM feature is defined in the future).

As such, when the UE does not have an allowed NSSAI, optionally due to an ongoing NSSAA procedure, the UE may verify the trigger for a service request procedure based on which the UE may determine whether to initiate the procedure by sending the appropriate NAS message (e.g., service request message or of control plane service request message) or not. If the UE determines that the trigger is for a MUSIM feature, then the UE may allow/initiate the procedure by sending the service request message or the control plane service request message. Otherwise, if the trigger is not related to a MUSIM feature, the UE may not initiate the procedure except if the trigger is for an existing exception as described in 3GPP TS 24.501 V17.3.1.

The UE may first determine what action to take based on a configuration that is stored in the UE, where this configuration is either preconfigured in the UE or is received from the network (e.g., in any NAS message).

FIG. 1 is a flowchart illustrating an example UE behavior, according to an embodiment.

At S10, the UE receives a registration accept without an allowed NSSAI message from the network. At S20, a trigger for a service request is received or is available.

As S30, the UE verifies if the trigger is related to at least one MUSIM feature. If the trigger is not related to at least one MUSIM feature, at step S40, the procedure is blocked and flow returns to S10.

If the trigger is related to at least one MUSIM feature, the procedure is allowed or initiated and the necessary NAS message is sent, at S50. For example, the NAS message may be a (control plane) service request message.

Another embodiment involves obtaining MUSIM services when a UE is in 5GMM-CONNECTED mode with RRC inactive indication. This provides a new behavior for a UE to obtain a USIM service. This may only apply to mobile originated requests for a MUSIM feature (i.e., requests that are originated by the UE and not terminated at the UE, and not initiated by the network).

Herein, a request that is related to a MUSIM feature, or a request to obtain a MUSIM service, may refer to the sending of a NAS message where the NAS message optionally includes the UE request type IE, and the IE may optionally be set to indicate "NAS signalling connection release" or any value that may be defined in the future for this IE.

In a first option, when the UE in the 5GMM-CONNECTED mode with RRC inactive indication requires to use a MUSIM feature/service, the UE may send a NAS message and include the UE request type IE. The IE may be set to "NAS signalling connection release" or any value that may be defined in the future for this IE. The UE may first request the lower layers (e.g., the RRC layer) to resume the connection, and then the UE sends the NAS message, optionally after the connection is resumed.

The NAS message to be used may be any of the following: a registration request message, a service request message, or a control plane service request message. At least in the case when the UE request type IE is set to "NAS signalling connection release", the UE may ensure that the NAS message (e.g., any of those listed above) may not include the uplink data status IE.

Figure 2:
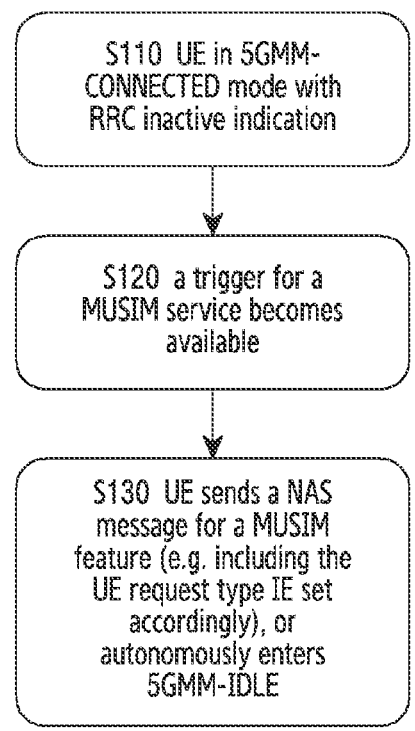
FIG. 2 is a flowchart illustrating how a UE may obtain MUSIM service when in a fifth generation mobility management (5GMM)-CONNECTED mode with a radio resource control (RRC) inactive indication, according to an embodiment.

FIG. 2 is a flowchart illustrating how a UE may obtain MUSIM service when in a 5GMM-CONNECTED mode with an RRC inactive indication, according to an embodiment.

At S110, the UE is in a 5GMM-CONNECTED mode with RRC inactive indication.

At S120, a trigger for a MUSIM service becomes available.

At S130, the UE sends or transmits a NAS message for a MUSIM feature (e.g., including the UE request type IE set accordingly) or else autonomously enters 5GMM-IDLE mode.

As described above, the NAS message that can be sent at S130 may be a registration request message, a service request message, or a control plane service request message, where the NAS message may include the UE request type IE set to the appropriate value.

When the UE (e.g., NAS) in the 5GMM-CONNECTED mode with RRC inactive indication requests the lower layers (e.g., RRC layer) to resume the connection for a MUSIM service, and the UE then receives an indication from the lower layers that the resumption of the RRC connection has failed, then the UE may behave as set forth below.

The UE may autonomously enter an 5GMM-IDLE mode. The UE may autonomously attempt to select another PLMN for the related MUSIM service.

If the UE (e.g., as required in 3GPP TS 24.501 V17.3.1) enters the 5GMM-IDLE mode after which the UE is required to trigger a NAS procedure (e.g., registration procedure) for the N1 NAS signalling connection recovery, the UE may determine to delay the procedure until the MUSIM service is obtained (e.g., by the UE using another USIM or attempting to use another PLMN). As such, the UE may delay the NAS procedure (e.g., registration procedure) until the UE terminates the MUSIM service and the UE may later perform the procedure after using a service on another PLMN. As such, after entering the 5GMM-IDLE mode as required in 3GPP TS 24.501 V17.3.1, the UE selects another PLMN to use a service, and after that is completed the UE can later reselect to this PLMN (where the indication about the resumption failure was received) and the UE may then perform the NAS procedure (e.g., registration procedure) to recover the N1 NAS signalling connection.

If the UE in the 5GMM-CONNECTED mode with RRC inactive indication transitions to 5GMM-IDLE mode for any trigger (e.g., due to a trigger to send a registration request message with the NG-RAN-RCU bit of the 5GS update type IE set to "UE radio capability update needed" or due to a fallback indication from the lower layers), and if the UE also requires to select another PLMN to obtain services on another USIM, then the UE may delay the NAS procedure that is required to be sent on the current PLMN. The UE may first attempt to use another PLMN to obtain the necessary services and then upon termination of the service (or after some other time elapses), the UE may then return to this PLMN (where the UE initially needed to perform a NAS procedure from 5GMM-IDLE mode) and perform the necessary NAS procedure. As such, the UE may delay the procedure instead of immediately performing upon transitioning to the 5GMM-IDLE mode. This helps to reduce any delays in obtaining services from another PLMN.

The UE may behave as described above with the respective steps being performed in any combination or in any order.

In a second option, when the UE in the 5GMM-CONNECTED mode with RRC inactive indication requires to use a MUSIM feature/service, the UE may autonomously enter 5GMM-IDLE mode (e.g., by locally releasing its NAS connection). The UE may then attempt to use a MUSIM service on another PLMN by reselecting to that PLMN once in the 5GMM-IDLE mode. An example of such UE behavior is shown in S130 of FIG. 2.

In another embodiment, MUSIM services may be obtained when a UE is in 5GMM-IDLE mode with suspend indication.

Herein, a request that is related to a MUSIM feature, or a request to obtain a MUSIM service, may refer to the sending of a NAS message where the NAS message optionally includes the UE request type IE, and the IE may be set to indicate "NAS signalling connection release" or "rejection of paging" or any value that may be defined in the future for this IE.

The following description applies to a UE that is either in N1 mode (5GS) or in S1 mode (EPS), and as such the appropriate NAS mode and NAS message can be used accordingly.

In a first option, when the (N1 mode) UE in the 5GMM-IDLE mode with suspend indication requires to use a MUSIM feature/service, the UE may send a NAS message and include the UE request type IE. The IE may be set to "NAS signalling connection release" or "rejection of paging" or any value that may be defined in the future for this IE. The UE may first request the lower layers (e.g., the RRC layer) to resume the connection and then the UE sends the NAS message optionally after the connection is resumed.

The NAS message to be used may be any of the following: a registration request message, a service request message, or a control plane service request message. At least for the case when the UE request type IE is set to "NAS signalling connection release", the UE may ensure that the NAS message (e.g., any of those listed above) may not include the uplink data status IE.

When the (S1 mode) UE in EMM-IDLE mode with suspend indication requires to use a MUSIM feature/service, the UE may send a NAS message and include the UE request type IE. The IE may be set to "NAS signalling connection release" or "rejection of paging" or any value that may be defined in the future for this IE. The UE may first request the lower layers (e.g., the RRC layer) to resume the connection and then the UE may send the NAS message optionally after the connection is resumed.

The NAS message may be any of the following: a (combined) tracking area update request message, a service request message, a control plane service request message, or a (combined) attach request message. At least for the case when the UE request type IE is set to "NAS signalling connection release", the UE may ensure that the NAS message (e.g., any of those listed above) may not include the uplink data status IE.

In a second option, when the (N1 mode) UE in 5GMM-IDLE mode with suspend indication requires to use a MUSIM feature/service, the UE may autonomously enter the 5GMM-IDLE mode and attempt to use a MUSIM feature (e.g., on another PLMN).

When the (S1 mode) UE in the EMM-IDLE mode with suspend indication requires to use a MUSIM feature/service, the UE may autonomously enter the EMM-IDLE mode and attempt to use a MUSIM feature (e.g., on another PLMN).

Figure 3:
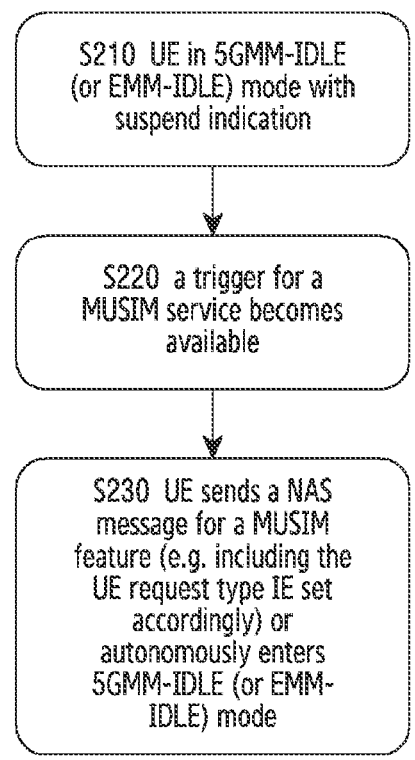
FIG. 3 is a flowchart illustrating how a UE may obtain MUSIM service when in a 5GMM-IDLE/EMM-IDLE mode with a suspend indication, according to an embodiment.

FIG. 3 is a flowchart illustrating how a UE may obtain a MUSIM service when in the 5GMM-IDLE/EMM-IDLE mode with suspend indication, according to an embodiment.

At S210, the UE may be in 5GMM-IDLE (or EMM-IDLE) mode with suspend indication.

At S220, a trigger for a MUSIM service may become available.

At S230, the UE may send or transmit a NAS message for a MUSIM feature (e.g., including the UE request type IE set accordingly), or the UE autonomously enters 5GMM-IDLE (or EMM-IDLE) mode, as per the second option, described above.

As described above, the NAS message that can be sent in S230 may be a registration request message, a service request message, or a control plane service request message, where the NAS message may include the UE request type IE set to the appropriate value.

The embodiment described below applies to all cases and is not limited to one mode only. In S1 mode, when the UE sends the control plane service request message or the tracking area update request message in which the UE request type IE is included (that may be set to any value), the UE may not set the "active flag" bit to a value that indicates that the radio bearer establishment is required/requested (i.e., the value may not be set to 1). The UE may set the value of the bit such that it indicates that no radio bearer establishment is required/requested (i.e., the bit may be set to 0). This is to avoid the establishment of user plane that leads to delays in the MUSIM feature/service.

When the network (e.g., MME) receives a NAS message (e.g., control plane service request message or tracking area update request message) in which the "active flag" bit is set to a value such that the value indicates that radio bearer establishment is required/requested (i.e., the value is set to 1), then the network (e.g., MME) may ignore the bit or treat the bit as if it was set to a value indicating that no radio bearer establishment is required/requested (i.e., treat the bit as if it was set to 0) and hence the network (e.g., MME) may not establish the user plane resources (or may not establish the radio bearer resources and/or other corresponding EPS bearer resources for the user plane).

When the network (e.g., MME) receives a NAS message (e.g., control plane service request message or the tracking area update request message) in which:
the "active" flag bit is set to a value such that the value indicates that radio bearer establishment is required/requested (i.e., the value is set to 1), and
the UE request type IE is included in the NAS message such that the request type indicates "NAS signalling connection release" (or optionally indicates "rejection of paging" or any value that may be defined in the future)
then the network (e.g., MME) may ignore the bit or treat the bit as if it was set to a value indicating that no radio bearer establishment is required/requested (i.e., treat the bit as if it was set to 0). Hence, the network (e.g., MME) may not establish the user plane resources (or may not establish the radio bearer resources and/or other corresponding EPS bearer resources for the user plane).

Alternatively, when the NAS message includes the UE request type IE such that the request type indicates "NAS signalling connection release", the MME may simply ignore the value of the "active" flag bit in the NAS message regardless of its value and as such the MME may always consider the bit to indicate a value of zero even when the bit indicates a value of 1. Hence, the network (e.g., MME) may not establish the user plane resources (or may not establish the radio bearer resources and/or other corresponding EPS bearer resources for the user plane).

Alternatively, whenever the MME receives a NAS message (e.g., a control plane service request message or a tracking area update request message) in which the "active" flag is set to 1 in the appropriate IE (e.g., in the control plane service type IE or in the EPS update type IE, respectively), then the MME may verify if the NAS message also contains the UE request type IE. The IE may be set to a value that indicates "NAS signalling connection release" (or any other value). If the NAS message contains the UE request type IE (i.e., if the NAS message also indicates that the NAS signalling may be released), then the MME may ignore the value of the "active" flag bit regardless of its value or even if the bit is set to a value of 1. As such, under the conditions described above, the MME may consider that the value of the "active" flag is 0 and hence the MME may not establish the user plane resources for the EPS bearers.

In other words, if the MME verifies a NAS message in which the "active" flag is set to 1 and determines that the UE request type IE is not included, or the UE request type IE is included but does not indicate "NAS signalling connection release", then the MME may establish the user plane resources for the EPS bearers of the UE. Otherwise, the MME may not establish the user plane resources.

Accordingly, the following MME behavior may be defined. If the "active" flag is set in the tracking area update request message and:
control plane consumer Internet of things (CIOT) EPS optimization is not used by the MME; and
the UE request type IE is not included in the tracking area update request message or the UE request type IE is included in the tracking area update request message but the request type is not set to "NAS signalling connection release";
the MME shall re-establish the radio and S1 bearers for all active EPS bearer contexts.

If the "active" flag is set in the tracking area update request message and:
control plane CIOT EPS optimization is used by the MME,
the UE request type IE is not included in the tracking area update request message or the UE request type IE is included in the tracking area update request message but the request type is not set to "NAS signalling connection release";

the MME shall re-establish the radio and S1 bearers for all active EPS bearer contexts associated with PDN connections established without a control plane only indication.

If the "active" flag is set in the tracking area update request message, the message does not contain the UE request type IE with the request type indicating "NAS signalling connection release", and control plane CIOT EPS optimization is not used by the MME, the MME may re-establish the radio and S1 bearers for all active EPS bearer contexts. If the "active" flag is set in the tracking area update request message, the message does not contain the UE request type IE with the request type indicating "NAS signalling connection release", and control plane CIOT EPS optimization is used by the MME, the MME shall re-establish the radio and S1 bearers for all active EPS bearer contexts associated with PDN connections established without a control plane only indication.

The steps described above can also apply for any other NAS message in which the "active" flag may be set/sent/included.

A similar proposal may apply for an AMF in 5GS, where the AMF may only establish the user plane resources (when requested to do so by the UE via the use of the uplink data status IE) if the NAS message (e.g., registration request message, service request message, or control plane service request message) either:

does not include the UE request type IE, or
includes the UE request type IE but the request type is not set to "NAS signalling connection release".

As such, if the UE request type IE is included in a NAS message such that the request type is set to "NAS signalling connection release" (or any other value), then the AMF may not request the SMF to establish the user plane resources for the UE regardless of the values of the individual bits in the uplink data status IE (i.e., even if the bits are set such that user plane resources are requested to be established for a corresponding PDU session identity).

The details above can also apply to the allowed PDU session status IE.

Alternatively, when the AMF receives the uplink data status IE (and/or the allowed PDU session status IE) such that any bit in the IE is set to the value 1 (i.e., there is at least one PDU session identify for which user plane resources are being requested to be (re) established), then the AMF may further verify if the UE request type IE is included, and if so, what value does the request type indicate. If the IE is included and the request type is set to "NAS signalling connection release" (or optionally any other value), then the AMF may not indicate/request the SMF to establish the user plane resources for a given PDU session identity (for which the bit is in the uplink data status IE is set to 1). However, if the IE is not included, or if the IE is included but the Request type is not set to "NAS signalling connection release", then the AMF may request/indicate to the SMF to establish the user plane resources for the UE (assuming no other conditions for not doing so applies). The proposals above may apply for any NAS message.

The core network node (e.g., MME or AMF) may be configured to operate such that if the core network receives:

any NAS message with the "active" flag set to 1 (i.e., user plane resource activation is requested) and the UE request type IE for which the Request type is set to "NAS signalling connection release", then the core network node (e.g., MME) may determine to establish the user plane resources and optionally ignore the request to release the NAS signalling connection (i.e., the user plane resource establishment request overrides the request to release the NAS connection). The MME may additionally send the EMM status message to inform the UE about the error of sending these two conflicting requests, any NAS message that includes any of the uplink data status IE or the allowed PDU session status IE, such that one or more bit in the IE is set to a value that requests the establishment of user plane resources for a PDU session (identity), then the AMF may determine to establish the user plane resources and optionally ignore the request to release the NAS signalling connection (i.e., the user plane resource establishment request overrides the request to release the NAS connection). The AMF may additionally send the 5GMM STATUS message to inform the UE about the error of sending these two conflicting requests.

As such, in general, the core network node may be configured to either prioritize the establishment of user plane resources (via the active flag or the uplink data status IE/Allowed PDU session status IE for an MME or AMF, respectively) over NAS connection release, when both are requested, or vice versa (i.e., the core network node prioritizes NAS connection release over establishment of user plane resources when both are requested in the same message, as described above). The core network behavior may be based on implementation and may be either of the options proposed herein.

Additionally, when the UE wants to request the establishment of user plane resources by:

setting the "active" flag to 1 in any NAS message (e.g., a control plane service request message or a tracking area update request message), then the UE may ensure that the NAS message does not include the UE request type IE such that the request type indicates "NAS signalling connection release". In other words, for any NAS message that contains an "active" flag with a value of 1, the UE request type IE may be included but its value may not be set to "NAS signalling connection release". In this case, it may be preferred that the UE request type IE is not sent.

Requesting the establishment of user plane resources via the uplink data status IE or via the allowed PDU session status IE (e.g., when the UE uses these IEs and sets the bits to 1 such that the UE is requesting the establishment of user plane resources), then the UE may ensure that the NAS message does not include the UE request type IE such that the request type indicates "NAS signalling connection release". In other words, for any NAS message which contains the uplink data status IE or the allowed PDU session status IE such that any of the bits is set to 1 (i.e., the UE is requesting the establishment of user plane resources), the UE request type IE may be included but its value may not be set to "NAS signalling connection release". In this case, it may be preferred that the UE request type IE is not sent.

For cases b and m in clause 5.6.1.1, if the UE has pending IP, non-IP, or Ethernet user data that is to be sent via the user plane radio bearers, the UE may set the control plane service type of the control plane service request message to "mobile originating request" and the "active" flag in the control plane service type IE to 1. The UE shall not include any ESM message container or NAS message container IE in the control plane service request message. Additionally for case m, the control plane service request message shall not include the UE request type IE with the request type indicating "NAS signalling connection release". Similarly, in 5GS (i.e., in N1 mode), when the UE wants to request the establishment of user plane resources via the uplink data status IE (or the allowed PDU session status IE which may be used to transfer a session across non-3GPP access and 3GPP access), the UE may not include the UE request type IE with the request type set to "NAS signalling connection release". This applies to all NAS messages such as the service request message, registration request message, and control plane service request message.

Additionally for case e) of the service request procedure, the service request message may not include the UE request type IE with the request type indicating "NAS signalling connection release".

Additionally for case k) of the service request procedure, the control plane service request message may not include the UE request type IE with the Request type indicating "NAS signalling connection release".

Figure 4:
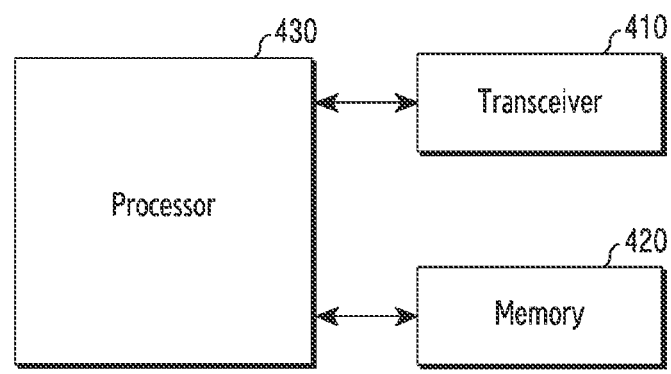
FIG. 4 is a diagram illustrating a structure of a UE, according to an embodiment.

FIG. 4 is a diagram illustrating a structure of a UE, according to an embodiment.

As shown in FIG. 4, the UE may include a transceiver 410, a memory 420, and a processor 430. The transceiver 410, the memory 420, and the processor 430 of the UE may operate according to a communication method of the UE described above. However, the components of the UE are not limited thereto. For example, the UE may include more or fewer components than those described above. In addition, the processor 430, the transceiver 410, and the memory 420 may be implemented as a single chip. Also, the processor 430 may include at least one processor. Furthermore, the UE of FIG. 4 corresponds to the UE of the FIG. 1 to FIG. 3.

The transceiver 410 collectively refers to a UE receiver and a UE transmitter, and may transmit/receive a signal to/from a base station or a network entity. The signal transmitted or received to or from the base station or a network entity may include control information and data. The transceiver 410 may include a RF transmitter for up-converting and amplifying a frequency of a transmitted signal, and a RF receiver for amplifying low-noise and down-converting a frequency of a received signal. However, this is only an example of the transceiver 410 and components of the transceiver 410 are not limited to the RF transmitter and the RF receiver.

Also, the transceiver 410 may receive and output, to the processor 430, a signal through a wireless channel, and transmit a signal output from the processor 430 through the wireless channel.

The memory 420 may store a program and data required for operations of the UE. Also, the memory 420 may store control information or data included in a signal obtained by the UE. The memory 420 may be a storage medium, such as ROM, RAM, a hard disk, a CD-ROM, a DVD, or a combination of storage media.

The processor 430 may control a series of processes such that the UE operates as described above. For example, the transceiver 410 may receive a data signal including a control signal transmitted by the base station or the network entity, and the processor 430 may determine a result of receiving the control signal and the data signal transmitted by the base station or the network entity.

Figure 5:
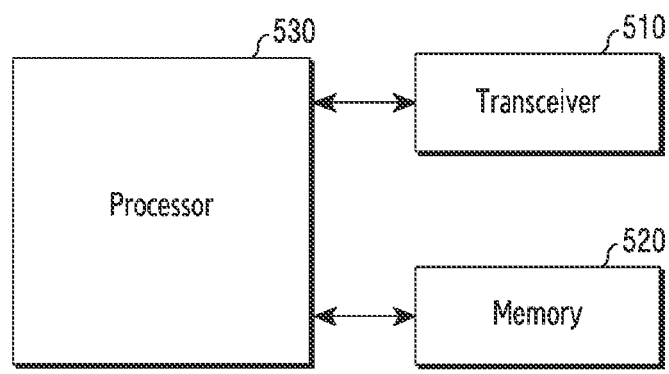
FIG. 5 is a diagram illustrating a structure of a base station, according to an embodiment.

FIG. 5 is a diagram illustrating a structure of a base station, according to an embodiment.

As shown in FIG. 5, the base station may include a transceiver 510, a memory 520, and a processor 530. The transceiver 510, the memory 520, and the processor 530 of the base station may operate according to a communication method of the base station described above. However, the components of the base station are not limited thereto. For example, the base station may include more or fewer components than those described above. In addition, the processor 530, the transceiver 510, and the memory 520 may be implemented as a single chip. Also, the processor 530 may include at least one processor. Furthermore, the base station of FIG. 5 supports the communication of the UE of FIG. 1 to FIG. 3. For example, the base station of FIG. 5 supports the NAS procedure between the core network (e.g., MME) and the UE of FIG. 3 to FIG. 5.

The transceiver 510 collectively refers to a base station receiver and a base station transmitter, and may transmit/receive a signal to/from a terminal (UE) or a network entity. The signal transmitted or received to or from the terminal or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

The transceiver 510 may receive and output, to the processor 530, a signal through a wireless channel, and transmit a signal output from the processor 530 through the wireless channel.

The memory 520 may store a program and data required for operations of the base station. Also, the memory 520 may store control information or data included in a signal obtained by the base station. The memory 520 may be a storage medium, such as ROM, RAM, a hard disk, a CD-ROM, a DVD, or a combination of storage media.

The processor 530 may control a series of processes such that the base station operates as described above. For example, the transceiver 510 may receive a data signal including a control signal transmitted by the terminal, and the processor 530 may determine a result of receiving the control signal and the data signal transmitted by the terminal.

Embodiments may be applied in different combination or order and may be applied in at least one mode only. Examples of specific modes are not to be considered as limitations of the embodiments but rather as an example.

At least some of the embodiments described herein may be constructed, partially or wholly, using dedicated special-purpose hardware. Terms such as "component", "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. The described elements may be configured to reside on a tangible, persistent, addressable storage medium and may be configured to execute on one or more processors. These functional elements may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example may be combined with features of any other embodiment, as appropriate, except where such combinations are mutually exclusive. Throughout this specification, the term "comprising" or "comprises" means including the component(s) specified but not to the exclusion of the presence of others.

All of the features disclosed herein (including any accompanying claims, abstract and drawings), and/or all of the steps of any method or process so disclosed, may be combined in any combination, except combinations where at least some of such features and/or steps are mutually exclusive.

Each feature disclosed herein (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to certain embodiments thereof, it will be understood by those skilled in the art that various changes in form and detail may be made therein without departing from the spirit and scope of the invention as defined by the appended claims.

What is claimed is:

1. A method performed by a user equipment (UE) in a wireless communication system, the method comprising:
    transmitting, to an access and mobility management function (AMF) entity, a registration request message;
    receiving, from the AMF entity, a registration accept message as a response to the registration request message, wherein the registration accept message includes registration result information with an indicator for a network slice-specific authentication and authorization (NSSAA) and pending network slice selection assistance information (NSSAI) and does not include an allowed NSSAI; and
    transmitting, to the AMF entity, a service request message, in case that the UE supports a multi-universal subscriber identity module (MUSIM) and the UE requests a non access stratum (NAS) signaling connection release.

2. The method of claim 1, wherein the UE is in a fifth generation mobility management (5GMM)-connected mode with a radio resource control (RRC) inactive indication.

3. The method of claim 1, further comprising:
    deleting the allowed NSSAI stored in the UE, in case that the registration accept message includes the registration result information with the indicator, and the pending NSSAI and does not include the allowed NSSAI.

4. The method of claim 1, wherein request type information included in the service request message is set to the NAS signaling connection release or a rejection of a paging.

5. A user equipment (UE) in a wireless communication system, the UE comprising:
    a transceiver; and
    a controller coupled with the transceiver and configured to:
        transmit, to an access and mobility management function (AMF) entity, a registration request message,
        receive, from the AMF entity, a registration accept message as a response to the registration request message, wherein the registration accept message includes registration result information with an indicator for a network slice-specific authentication and authorization (NSSAA) and pending network slice selection assistance information (NSSAI) and does not include an allowed NSSAI, and
        transmit, to the AMF entity, a service request message, in case that the UE supports a multi-universal subscriber identity module (MUSIM), and the UE requests a non access stratum (NAS) signaling connection release.

6. The UE of claim 5, wherein the UE is in a fifth generation mobility management (5GMM)-connected mode with a radio resource control (RRC) inactive indication.

7. The UE of claim 5, wherein the controller is further configured to:
    delete the allowed NSSAI stored in the UE, in case that the registration accept message includes the registration result information with the indicator, and the pending NSSAI and does not include the allowed NSSAI.

8. The UE of claim 5, wherein request type information included in the service request message is set to the NAS signaling connection release or a rejection of a paging.

9. A method performed by an access and mobility management function (AMF) entity in a wireless communication system, the method comprising:
    receiving, from a user equipment (UE), a registration request message;
    transmitting, to the UE, a registration accept message as a response to the registration request message, wherein the registration accept message includes registration result information with an indicator that a network slice-specific authentication and authorization (NSSAA) is to be performed, and pending network slice selection assistance information (NSSAI), and does not include an allowed NSSAI; and
    receiving, from the UE, a service request message, in case that the UE is a multi-universal subscriber identity module (MUSIM) UE, and a non access stratum (NAS) signaling connection is to be released.

10. The method of claim 9, wherein the UE is in a fifth generation mobility management (5GMM)-connected mode with a radio resource control (RRC) inactive indication.

11. The method of claim 9, wherein a deletion of the allowed NSSAI is based on whether the registration accept message includes the registration result information with the indicator, and the pending NSSAI, and does not include the allowed NSSAI.

12. The method of claim 9, wherein request type information included in the service request message is set to a NAS signaling connection release or a rejection of a paging.

13. An access and mobility management function (AMF) entity in a wireless communication system, the AMF entity comprising:
    a transceiver; and
    a controller coupled with the transceiver and configured to:
        receive, from a user equipment (UE), a registration request message,
        transmit, to the UE, a registration accept message as a response to the registration request message, wherein the registration accept message includes registration result information with an indicator that a network slice-specific authentication and authorization (NSSAA) is to be performed, and pending network slice selection assistance information (NSSAI), and does not include an allowed NSSAI, and receive, from the UE, a service request message, in case that the UE is a multi-universal subscriber identity module (MUSIM) UE, and a non access stratum (NAS) signaling connection is to be released.

14. The AMF entity of claim 13, wherein the UE is in a fifth generation mobility management (5GMM)-connected mode with a radio resource control (RRC) inactive indication.

15. The AMF entity of claim 13, wherein request type information included in the service request message is set to a NAS signaling connection release or a rejection of a paging.

16. The AMF entity of claim 13, wherein a deletion of the allowed NSSAI is based on whether the registration accept message includes the registration result information with the indicator, and the pending NSSAI, and does not include the allowed NSSAI.

* * * * *